United States Patent Office 3,539,688
Patented Nov. 10, 1970

3,539,688
METHOD OF CONTROLLING PESTIFEROUS ORGANISMS
Donald W. Fuhlhage, Kansas City, Mo., assignor to Thompson-Hayward Chemical Company, Kansas City, Kans., a corporation of Delaware
No Drawing. Filed Apr. 18, 1967, Ser. No. 631,601
Int. Cl. A01n 9/22
U.S. Cl. 424—263               6 Claims

ABSTRACT OF THE DISCLOSURE

This invention relates to a method of controlling pestiferous organisms, particularly nematodes, which comprises causing said organisms to be contacted with a small but effective amount of a compound of the formula;

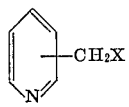

wherein X is halogen and suitable salts thereof.

---

This invention relates to and has for its objects the provision of novel methods of controlling certain pestiferous organisms, and new compositions useful therefor. More particularly, this invention relates to a novel method of controlling nematodes and to new compositions useful for this purpose.

Nematodes are parasitic organisms which attack the root of plants, stunting root growth, and thereby causing serious damage to the plant host. Nematodes attack a wide range of plants including many vegetable crops, fruit crops and grasses, causing great damage to said crops and a high rate of economic loss. It is also known that one species of nematode is capable of attacking many different kinds of plants and therefore good control of these pestiferous organisms is highly desirable.

Heretofore, certain nematocidal compositions have been employed to control these parasitic organisms, generally without complete success. The nematocidal compositions heretofore employed suffered from many disadvantages which precluded obtaining control of the parasitic nematodes. More particularly, it was found that the nematocidal compositions heretofore employed were unpredictably erratic in their behavior, were sometimes extremely phytotoxic to the plant host sought to be protected, and in addition were composed of such materials as to be dangerous and even injurious to the health of man and animals, for example, halogenated hydrocarbons and organic phosphate materials were widely employed.

A method has now been found whereby satisfactory control of these parasitic nematodes can be obtained while at the same time overcoming the disadvantages heretofore existing in this art. It has now been found that nematode pests may be effectively controlled by contacting said pests or causing said pests to be contacted with a small but effective amount of a member of the group consisting of compounds of the formula;

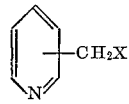

wherein X is halogen, (for example bromo, chloro, iodo); and suitable salts thereof.

Among the compounds which may be included within the scope of the instant invention may be listed such compounds as, 4-picolyl halide, such as 4-picolyl chloride, 4-picolyl bromide; 3-picolyl halide, such as 3-picolyl chloride, 3-picolyl bromide; 2-picolyl halide, such as 2-picolyl chloride, 2-picolyl bromide; and the suitable salts thereof.

Among the suitable salts of the compounds of this invention, are the acid addition salts which may be prepared from the appropriate inorganic or organic acids. For example, the appropriate salts may be prepared from such acids as hydrochloric acid, sulfuric acid, phosphoric acid, nitric acid and acetic acid, as may be desired by the skilled worker practicing the invention.

The nematodes sought to be controlled by the practice of this invention are contacted or caused to be contacted with nematocidal amounts of the compounds of this invention in their natural environment and for this purpose they may be incorporated into the soil in which is found the host plant. To accomplish this purpose, the nematocidal compound may be mechanically incorporated into the soil or alternatively may be incorporated therein by applying the nematocidal compositions of this invention to the surface of the soil sought to be treated and thereafter applying to, or "drenching" the surface with, water or some other suitable solvent to cause the nematocidal compositions to become incorporated in the soil. However, any method whereby the nematocidal compounds are incorporated into the soil and thus brought in contact with the nematode to be controlled may be satisfactorily employed in the practice of this invention.

The compounds of this invention may be employed in nematocidal compositions which may be prepared by combining the nematocidal compounds of this invention with a substantial amount of a conventional carrier which is inert to the nematocidal compound, to form solutions, dusts, wettable powders, granules and other like formulations. To prepare these compositions in the form of granules, powder or dust, the nematocidal compounds of this invention may be mixed with any of a number of carriers either organic or inorganic in nature which are suitable for the manufacture of pulverulent preparations. In addition to mixing the ingredients directly, the nematocidal compounds of this invention may first be dissolved in a suitable solvent and the dry extending agents may be treated with the resulting solution so that after the solvent evaporates off the active ingredient is effectively impregnated by adsorption or absorption of the carrier. The carriers which may be employed include, for example, tricalcium phosphate, calcium carbonate, attapulgite, kaolin, bole, kieselguhr, montmorillonite, talc, calcined magnesia and others. Materials of vegetable origin such as powdered cork, powdered wood and powdered walnut shells are also useful. These resultant compositions may be used in the dry form or, by the addition of wetting agents, the dry powder can be rendered wettable by water so as to obtain stable aqueous dispersions suitable for employment as liquid compositions. Among the solvents which may be employed in the practice of this invention may be included such materials as naphtha, kerosene, toluene, cyclohexanone, acetone and the like, as may be determined by the skilled worker.

It has been found that satisfactory results are obtained in the practice of this invention, when the nematocidal compound of the invention is present in these compositions in an amount of from 3% to 100% by weight of the final composition, and optimally, in an amount of from 15% to 90% by weight of the final composition incorporated in the soil wherein the nematode pests sought to be controlled are found.

Among the parasitic nematodes which may be controlled by the practice of this invention may be included such species of nematode as, *Meloidogyne sp.*, *Melilotus sp.*, *Radopholus sp.*, and *Trichodorus sp.* It has been preferably found that the practice of this invention results in the control of the *Meloidogyne* species of nematode.

Satisfactory control of the nematode parasites is obtained in the practice of this invention when the nematode sought to be controlled is caused to be contacted with the nematocidal compounds of this invention in a concentration of 750 parts per million or less, and most preferably in a concentration of 500 parts per million or less.

The invention may be further illustrated by the following examples:

EXAMPLE 1

A solution of 15 grams of 2-picolyl chloride in 35 grams of benzene is impregnated on 85 grams of 10–30 mesh bentonite. This mixture is agitated, preferably in a tumbler mixer, at a temperature of 40° C. until the benzene is evaporated off. The resulting granules are incorporated in the soil in which nematode control is desired.

Similarly, following the procedure of Example 1, but substituting an equivalent amount of 2-picolyl bromide for 2-picolyl chloride, like results are obtained.

EXAMPLE 2

A freshly prepared water solution of the phosphate salt of 4-picolyl chloride is applied by spraying or sprinkling to the surface of the soil in which nematode control is desired. Incorporation is achieved by further watering.

EXAMPLE 3

To determine the nematocidal activity of sample compounds against a species of Panagrellus, an active saprozoic nematode, the nema are first collected from the culture medium in a routine manner to insure their freedom from food contamination and uniformity of age by means of a Baerman funnel technique. The test is carried out in stoppered test tubes containing ten ml. of the sample compound dosage to be tested and the nematode population, at the time of seeding, is adjusted to 50–57 per tube. The test is run in duplicate and against a know nematocide and a control, which contains nema in tap water. Microscopic observations on the behavior of the nema are made daily over a period of five to seven days to establish the rapidity of action of the sample compound and the final end point of kill. The constant and active movement of the test species permits easy identification of live and dead individuals. The results of the test are reported below in Table 1.

TABLE 1

| Sample compound | Dosage, p.p.m. | Percent mortality after— | | |
|---|---|---|---|---|
| | | 1 Day | 3 days | 5 days |
| Control | | 0 | 0 | 0 |
| 3-picolylchloride HCl | 500 | 100 | 100 | 100 |
| | 50 | 50 | 100 | 100 |
| | 5 | 0 | 0 | 0 |

EXAMPLE 4

Sample compounds are tested as soil treatments for the control of the root knot nematode, *Meliodogyna hapla* using tomato seedlings as the index crop. A stock culture of root knot nematode (*Meliodogyna hapla*) is retained in large containers in the greenhouse in which tomato plants are constantly being replaced in order to replenish the food supply of the nema. This heavily infested stock culture for use purposes is then diluted in a ratio of one part infested soil to eight parts of ordinary greenhouse potting soid. This results in a soil mixture containing a moderately heavy inoculum potential.

Sample compounds for test purposes are prepared either as acetone-water solutions or as wettable powders and thoroughly incorporated or admixed into the root knot infested soil. This treated soil lot is then allocated to four replicated pots and covered for a period of 24 hours in order to permit any fumigant action to take place in the event that the chemicals do have some degree of vapor pressure. The pots are then uncovered and still allowed to remain unplanted for a period of three days in order to allow some dissipation of the chemical in the event that they should be phytotoxic. At the end of this period they are planted with tomato seedlings which provide good index plants for the development of the root knot gall. The extent of control (lack of root knot or gall formation) is observed some three weeks later at which time the plants are removed from their pots, the root systems thoroughly washed and the extent of root galling observed and recorded.

Data are recorded on phytotoxically and on root knot control. Phytotoxicity is scored on a system of 0 to 10 in which 0 indicates no injury to the other extreme where 10 indicates that the plants were killed. Root Knot control is expressed as the "Root Knot Index." Plants are rated on a scale of 5 to 0 in which 5 indicates no root knots being present, or 100% control, to the other extreme where 0 indicates that no root knot control was present and the root system looked similar to the untreated controls. The results obtained are reported in Table 2 below.

TABLE 2.—ROOT KNOT POT PEST

| Sample compound | Dose, p.p.m. | Phytotoxicity rating | Root knot index |
|---|---|---|---|
| 4-picolyl chloride HCl | 50 | 0 | 5 |
| 2-picolyl chloride HCl | 50 | 0 | 5 |
| Control | | 0 | 0 |

What is claimed is:

1. A method of controlling nematodes which comprises causing said nematodes to be contacted with a nematocidal amount of a member of the group consisting of a compound of the formula

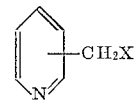

wherein X is selected from the group consisting of Br and Cl; and the acid addition salts thereof.

2. The method of claim 1, wherein X is chlorine.
3. The method of claim 1, wherein X is bromine.
4. The method of claim 1, wherein the compound is 4-picolyl chloride.
5. The method of claim 1, wherein the compound is 2-picolyl chloride.
6. The method of claim 1, wherein the compound is 3-picolyl chloride.

References Cited

UNITED STATES PATENTS 3,105,005  9/1963  Cannon et al. _____ 167—33

FOREIGN PATENTS 1,394,362  2/1965  France.

OTHER REFERENCES

Klingsberg et al.: "Pyridine and Derivatives," Pt. 2, Interscience Publishing Co. Inc., N.Y., 1961, pp. 189, 304, and 360–361.

ALBERT T. MEYERS, Primary Examiner
V. D. TURNER, Assistant Examiner